United States Patent [19]

Evers et al.

[11] 3,970,716
[45] July 20, 1976

[54] FLAME RESISTANT THERMOPLASTIC BLEND

[75] Inventors: Carl A. Evers, Naugatuck; Harold G. Wolf, Jr., Waterbury; Howard S. Kravitz, Naugatuck, all of Conn.

[73] Assignee: Uniroyal, Inc., New York, N.Y.

[22] Filed: June 5, 1974

[21] Appl. No.: 476,344

[52] U.S. Cl. ........................ 260/859 R; 260/18 N; 260/45.7 P; 260/45.7 R; 260/45.75 R; 260/45.8 A; 260/859 PV
[51] Int. Cl.² .................................. C08L 75/00
[58] Field of Search ........................ 260/859 R

[56] References Cited
UNITED STATES PATENTS

| | | | |
|---|---|---|---|
| 3,382,204 | 5/1968 | Gouinlock | 260/45.75 R |
| 3,385,819 | 5/1968 | Gouinlock | 260/45.75 R |
| 3,392,136 | 7/1968 | Hindersinn | 260/31.8 R |
| 3,403,036 | 9/1968 | Hindersinn | 260/45.7 R |
| 3,429,948 | 2/1969 | Massoubre | 260/859 R |
| 3,594,449 | 7/1971 | Binder | 260/859 R |
| 3,882,191 | 5/1975 | Balatoni | 260/859 PV |
| 3,929,928 | 12/1975 | Wolf et al. | 260/859 R |

*Primary Examiner*—Paul Lieberman
*Attorney, Agent, or Firm*—Bruce F. Jacobs

[57] ABSTRACT

Thermoplastic blends of polyurethane polymers, chlorinated polyethylene polymer, optionally polyethylene resins and antimony trioxide, and a flame retardant selected from 1,2,3,4,7,8,9,10,13,13,14,14-dodecachloro-1,4,4a,6a,7,10,10a,12a-octahydro-1,4:7,10-dimethanodibenzocyclooctane, 1,2,3,4,5,6,7,8,10,10,11,11-dodecachloro-1,4,4a,4b,5,8,8a,9a-octahydro-1,4:5,8-dimethanodibenzofuran, 6-(1',4',5',6',7',7'-hexachloronorborn-5'-en-2'-yl)-1,2,3,4,10,10-hexachloro-1,4,4a,5,6,7,8,8a,-octahydro-1,4:5,8-dimethanonaphthalene, and 6-(1',4',5',6',7',7'-hexachloronorborn-5'-en-2'-yl)-1,2,3,4,10,10-hexachloro-1,4,4a,5,6,7,8,8a-octahydro-1,4-methanonaphthalene, are flame resistant and also essentially retain the good physical properties of a polyurethane-chlorinated polyethylene polymer blend not containing a flame retardant.

15 Claims, No Drawings

FLAME RESISTANT THERMOPLASTIC BLEND

BACKGROUND OF THE INVENTION

1. Field of the Invention

This invention relates to a flame resistant blend of a polyurethane polymer, a chlorinated polyethylene, optionally polyethylene resin, and a flame retardant selected from the group of 1,2,3,4,7,8,9,10,13,13,14,14-dodecachloro-1,4,4a,-6a,7,10,10a,12a-octahydro-1,4:7,10-dimethanodibenzocyclooctane (DCCO), 1,2,3,4,5,6,7,8,10,10,11,11-dodecachloro-1,4,4a,4b,5,8,8a,9a-octahydro-1,4:5,8-dimethanodibenzofuran (DCOB), 6-(1′,4′,5′,6′,7′,7′-hexachloronorborn-5′-en-2′-yl)-1,2,3,4,10,10-hexachloro-1,4,4a,5,6,7,8,8a-octahydro-1,4:5,8-dimethanonaphthalene (DCDN), and 6-(1′,4′,5′,6′,7′,7′-hexachloronorborn-5′-en-2′-yl)-1,2,3,4,10,10-hexachloro-1,4,4a,5,6,7,8,8a-octahydro-1,4-methanonaphthalene (DCMN). Also antimony oxide may be included to reduce the amount of retardant necessary.

Chemical structures of these flame retardants are as follows:

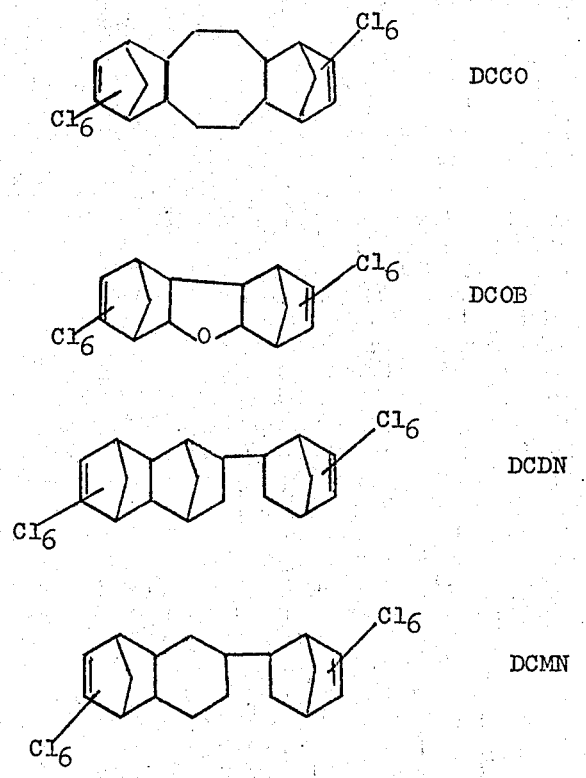

2. Description of the Prior Art

Some of the flame retardants used herein have been heretofore used with a variety of other polymers, including polypropylene, polyvinyl chloride, etc. Some have also been said to be useful for polyurethanes, though no specific examples of such have been shown and no use in a polyurethane-chlorinated polyethylene blend has been shown at all. See U.S. Pat. Nos. 3,382,204; 3,385,819; 3,392,136; 3,396,201 and 3,403,036 as well as German OS No. 2,153,101. Moreover, all of these references require the use of very high loadings of the flame retardants in order to produce the retardancy. The blends of the present invention require no more than 25 pph. of total flame retardant with or without antimony trioxide. Additionally, the physical properties of the flame resistant samples of the references are decidedly inferior to those of the non-flame resistant samples therein. On the contrary in this invention, the physical properties of the flame resistant blends are almost identical with those of the non-flame-resistant blends.

SUMMARY OF THE INVENTION

Accordingly, it is an object of this invention to provide elastomeric, semi-rigid, and rigid flame-resistant polyurethane-chlorinated polyethylene blends in which there is little or no deterioration of physical properties, i.e. the present invention is based on the discovery that a blend comprising a thermoplastic polyurethane polymer and chlorinated polyethylene and optionally polyethylene resin may be flame retarded so as to maintain the excellent physical properties thereof.

DESCRIPTION OF THE PREFERRED EMBODIMENTS

The invention is directed to a flame resistant blend of thermoplastic, especially elastomeric, polyurethane polymer and chlorinated polyethylene polymers, the weight ratio of polyurethane to chlorinated polyethylene being from 95:5 to 50:50, preferably 90:10 to 60:40. Polyethylene resin may optionally be added thereto in an amount of up to about 6 parts, preferably 2 to 4 parts, per 100 parts by weight of the thermoplastic polyurethane polymer plus the chlorinated polyethylene. Such inclusion of polyethylene improves the moisture resistance of the final compositions.

The flame retardants useable herein are the aforementioned DCCO, DCOB, DCDN and DCMN and are used in an amount of about 15–25 parts per 100 parts by weight of polyurethane plus chlorinated polyethylene. In addition to the specified flame-retardants, antimony trioxide ($Sb_2O_3$) may be included. When antimony trioxide is included, the amount of the other flame retardant may be reduced to as little as about 5 parts, provided that the total level of flame retardant plus antimony trioxide is about 13 to 25 parts, preferably 17 to 20 parts per hundred as defined above.

The polyurethane used in the invention is a conventional material (see, for example "Polyurethane Technology", by Bruins, Interscience Publishers, pages 198–200; also "Modern Plastics Encyclopedia", 1968, page 289). Examples are such polyether based polyurethanes as those made from 1 equivalent of polytetramethylene ether glycol, 2 to 5 equivalents of methylene bis(4-phenyl isocyanate) and 1 to 4 equivalents of 1,4-butane diol; and polyester based polyurethanes such as are similarly derived from 1,4-butane diol-adipic acid polyester and MDI (Rubber Chemistry and Technology, Vol. 35, 1962, page 742, Schollenberger et al.). Commercially available materials of this category include Estane (trademark), Texin (trademark) 480-A, Roylar (trademark) E-9. Many such products may be described as reaction products of a polymeric polyol (e.g., a polyester glycol or a polyether glycol) with an organic polyisocyanate (whether aromatic, aliphatic or cylcoaliphatic), usually a diisocyanate, frequently along with a low molecular weight bifunctional material having two reactive hydrogens, such as glycol or diamine (see also U.S. Pat. Nos. 3,462,326, Steele et al., Aug. 19, 1969, especially col. 3, lines 1 to 35; also 3,678,129, Fischer, July 18, 1972, col. 8, line 65 to col. 2, line 9 and col. 3, lines 19–30.) Thermoplastic polyurethane polymers are high molecular weight materials substantially devoid of olefinic unsaturation wherein essentially all the —NCO groups have reacted with the active hydrogen containing components.

For the preparation of semi-rigid and rigid polyurethanes, polyols having relatively lower molecular weight (e.g. 100) may be employed in part or in whole for the higher molecular weight reactants depending on the degree of semi-rigid or rigid properties desired.

The chlorinated polyethylene employed in the invention is likewise a known material, being a resin produced by chlorination of linear polyethylene. Various forms of chlorinated polyethylene resins employed may be described as polymers having a glass transition temperature of −30°C. to −20°C. and chlorine content of 25–50 wt.%. The mechanical strength properties are a function of the molecular weight of polyethylene used, degree of residual crystallinity and the arrangement of chlorine atoms on the backbone. These materials are represented by the commercially available product known as "Tyrin" (trademark).

The polyethylene resins which are optionally employed may be either of the low density (e.g., 0.910–0.925 g/cc.), medium density (0.926–0.940 g/cc) or high density (e.g. 0.941–0.965 g/cc) type, whether prepared by high pressure processes or low pressure processes.

The flame retarding agents may be prepared in a closed vessel or under reflux conditions by reacting 2 moles of hexachloro cyclopentadiene with 1 mole of either 1,5-cyclooctadiene, furan, 5-vinyl-2-norbornene or 4-vinylcyclohexene resulting in DCCO, DCOB, DCDN and DCMN respectively. The above Diels-Alder type reaction is usually conducted using an excess of the hexachlorocyclopentadiene and may be carried out at a temperature of from 110°C. to 220°C. for about 2 to 100 hours. If so desired a suitable solvent such as xylene, dichlorobenzene or trichlorobenzene is employed. It is advantageous to add a stabilizer to the reaction mixture in order to suppress non-desirable side reactions. After completion of the reaction which may result in yields of the product as high as 95%, unreacted ingredients and solvents are removed by distillation preferably using reduced pressure. The product may be further purified by washing with and recrystallization from suitable solvents such as water, methanol, chloroform, petroleum ether and the like.

In addition to the principal components, the compositions of this invention may and normally would include other ingredients in minor amounts such as ozone, light and heat stabilizers, plasticizers, processing aids, fillers, coloring agents, and the like.

To prepare the blend, the polymers may first be premixed, for example in a dry blender. The sequence of addition of the ingredients for the blend is not critical, e.g. polyurethane, chlorinated polyethylene, flame retardant, and optional polyethylene and antimony trioxide may be loaded to the mixing device simultaneously or in any suitable sequence. It should be obvious to one of ordinary skill in the art that one would not start with the flame retardant or antimony trioxide but rather with at least a portion of one of the polymeric materials. This preblend may then be fluxed to a semi-molten state while working at elevated temperature (e.g., 320°–400°F., preferably 330°–360°F.), for example in an internal mixer such as a Banbury mixer, or on an open roll mill. If desired the polymers may be mixed in an extruder. A twin screw extruder or transfermix extruder may be used.

The major problem in preparing flame resistant polymers of all types, but especially thermoplastic polyurethane, is to achieve flame resistance without delteriously affecting the physical properties of the resultant blend. Accordingly, the selection and proportions of the various ingredients is critical to the invention herein.

The flame resistant blends herein are suitable for the manufacture of coated fabrics such as used in automobiles, aeroplanes, etc., as well as tubing, hoses, wire, and cable jacketing.

The following examples, in which all quantities are expressed by weight unless otherwise indicated, will serve to illustrate the practice of the invention in more detail.

EXAMPLE I

To prepare the material for Run No. 1, specified in Table I, to a Banbury type internal mixer where charged 870g of polyurethane polymer (Type B) prepared by reacting a polyol blend comprising one equivalent of polytetramethylene ether glycol (1,000 molecular weight) and two equivalents of 1,4-butanediol with 3.2 equivalents of methylenebis(4-phenylisocyanate), 430g of chlorinated polyethylene with a chlorine content of 48% and a melt viscosity of $21\times10^3$ poises at 190°C., 150 sec$^{-1}$, 26g of a stabilizer mixture containing epoxidized soybean oil, alkylated phenylphosphite (Polygard, trademark of Uniroyal, Inc.) and barium-cadmium compound (Mark WS, trademark of Argus Chemical Corp.), 78g antimony trioxide, and 156g of DCOB flame retardant (Dechlorane 602 manufactured by Hooker Chemical Corp.).

The mixer was run from room temperature to about 350°F. at 40 rpm over a period of about 4½ minutes at which time the charge was dropped, placed on a roll mill, sheeted, and diced. The resultant granules were dried at 230°F. for about 2 hours in a forced air oven. The dry material was extruded through a strip die of a D-S Extruder, Type Thermatic Model 15T (1½ inches) sold by Davis-Standard, Division of Crompton & Knowles Corporation, employing the following temperatures: rear — 380°F., zone II = 410°F., zone III — 400°F., zone IV = 300°F., die = 350°F. at 15 rpm. The 1½ in. × 60–80 mil. strip was cut to a ½ in. width, 5 in. length size for the Underwriters Laboratories test: Subject 94, Section 3, vertical.

The U.L. test has four possible burn ratings = SE-O, SE-I, SE-II and B. The essential differences between these ratings is that (1) for an SE-O rating, the average flaming combustion time is no more than 5 seconds, no individual sample has flaming combustion for more than 10 seconds, and no sample drips flaming particles which ignite dry absorbent surgical cotton; (2) for an SE-I rating, the average time is no more than 25 seconds, the maximum time for any one sample is 30 seconds, and no dripping occurs; (3) for an SE-II rating, the average time is 25 seconds, the maximum time is 30 seconds, but dripping of flaming particles does occur which burn only briefly but do ignite the dry absorbent cotton; (4) all others are deemed B.

Runs 2–8 were prepared in essentially the same fashion using the ingredient proportions indicated in Table I. As to the polyurethane polymer used, Type B is the above, Type A is prepared from one equivalent of polytetramethylene ether glycol with one equivalent of 1,4-butanediol and 2.1 equivalents of methylene-bis(4-phenylisocyanate), and Type C is prepared from one equivalent of polytetramethylene ether glycol with four equivalents of 1,4-butanediol and 5.3 equivalents of methylenebis(4-phenylisocyanate). As to the chlorinated polyethylene, Type H is as above and Type L has a chlorine content of 36% by weight and a melt viscosity of $21 \times 10^3$ poises. The DCCO is used as Dechlorane Plus 25 manufactured by Hooker Chemical Corporation.

Runs 4, 7, and 8 are outside the scope of the invention.

The burning test results indicate that the additives of the invention both with and without antimony trioxide provide thermoplastic compositions having excellent flame resistance provided they are used within the limits set forth. Run 7 demonstrates that the use of $Sb_2O_3$ alone is not satisfactory from the lack of flame resistance point of view. Another well known flame retardant additive, DBDO (decabromodiphenyl oxide) (FR-300-BA from Dow Chemical Co.), was substituted in run 8 for those of the invention with the $Sb_2O_3$ at comparable levels, thereby resulting in a blend with unsatisfactory flame resistance.

greatly reduced levels of $Sb_2O_3$, yet such compositions have at least equivalent flame resistant characteristics to a flame resistant composition using only $Sb_2O_3$ as the flame retardant. The results in Table III demonstrate that, in order to establish a flame resistant blend using $Sb_2O_3$ alone, about 15 parts thereof are necessary and this results in a large loss in tensile strength as compared even to a sample with 10 parts $Sb_2O_3$ which has unsatisfactory flame resistance. On the other hand, a composition of this invention which is flame resistant reestablishes the tensile strength of Run 12 over Run 13.

Runs 12 and 13 are outside the scope of this invention.

Table III

| Run No. | 12 | 13 | 14 |
|---|---|---|---|
| Polyurethane, Type B, Parts | 67 | 67 | 67 |
| Chloropolyethylene, Type H, Parts | 33 | 33 | 33 |
| Antimony trioxide, Parts | 10 | 15 | 6 |
| DCOB, Parts | — | — | 12 |
| Burn Rating | SE-II | SE-O | SE-O |
| Dripping | Yes | — | No |
| Tensile Strength, psi | 3500 | 2640 | 3500 |
| 300% Modulus, psi | 1520 | 1330 | 1460 |
| Elongation at break, % | 500 | 500 | 520 |

| Run No. | 1 | 2 | 3 | 4 | 5 | 6 | 7 | 8 |
|---|---|---|---|---|---|---|---|---|
| Polyurethane, Type | B | A | B | B | B | C | B | B |
| Polyurethane, Parts | 67 | 71.4 | 67 | 67 | 67 | 83.3 | 70 | 67 |
| Chloro-polyethylene, Type | H | L | L | H | H | H | H | H |
| Chloro-polyethylene, Parts | 33 | 28.6 | 30 | 33 | 33 | 16.7 | 30 | 33 |
| Polyethylene, Parts | — | — | — | — | 5 | — | — | — |
| Antimony trioxide, Parts | 6 | 7.1 | 10 | 6 | 6 | — | 10 | 10 |
| Additive, Type | DCOB | DCOB | DCOB | DCOB | DCCO | DCDN | — | DBDO |
| Additive, Parts | 12 | 14.3 | 5.5 | 6 | 12 | 16.7 | — | 12 |
| Burn Rating | SE-O | SE-O | SE-O | B | SE-O | SE-O | B | B |
| Dripping | NO | NO | NO | YES | NO | NO | YES | YES |

EXAMPLE II

Runs 9, 10 and 11 were prepared using essentially the procedure of Example I, Run 1 in order to demonstrate the trend of a loss in physical properties of the blend when $Sb_2O_3$ is used alone, even without using a sufficient amount thereof to establish a flame resistant composition. The addition of the DCOB additive, however, not only re-establishes substantially the original physical properties but also provides excellent flame resistance. The ingredients and results are summarized in Table II, with runs 9 and 10 being outside the scope of this invention.

Table II

| Run No. | 9 | 10 | 11 |
|---|---|---|---|
| Polyurethane, Type B, Parts | 70 | 70 | 70 |
| Chloropolyethylene, Type H, Parts | 30 | 30 | 30 |
| Antimony trioxide, Parts | — | 5.3 | 5.3 |
| DCOB, Parts | — | — | 8.7 |
| Burn Rating | B | B | SE-O |
| Dripping | YES | YES | NO |
| Tensile Strength, psi | 4520 | 4380 | 4520 |
| 300% Modulus, psi | 2480 | 2550 | 2320 |
| Elongation at break, % | 480 | 470 | 490 |
| Shore A Hardness | 90 | 72 | 90 |

EXAMPLE III

The basic procedure of Example I was substantially repeated herein for Runs 12, 13, and 14 to demonstrate further the excellent retention of physical properties when employing the compositions of the invention at

EXAMPLE IV

This example shows the beneficial effects gained in moisture stability by adding polyethylene resin to the basic composition herein. Runs 15–18 were prepared according to the basic procedure of Example I with the polyethylene also being charged to the Banbury mixer. The polyethylene used herein was a low-density (0.919 specific gravity) type with a melt flow index of 2.0 at 190°C.

As can be seen from Table IV, particularly good retention of physical properties occurred when 2.1 and 4.2 parts of polyethylene were added per 100 parts of polyurethane elastomer and chloropolyethylene combine. By "good retention" is meant that there is relatively little deterioration of the physical properties after the samples were aged for 7 days at 97% relative humidity at 97°C.

Run 18 is outside the scope of this invention due to the high polyethylene content.

Table IV

| Run No. | 15 | 16 | 17 | 18 |
|---|---|---|---|---|
| Polyurethane, Type B, Parts | 67 | 67 | 67 | 67 |
| Chloropolyethylene, Type H, Parts | 33 | 33 | 33 | 33 |
| Antimony trioxide, Parts | 6 | 6 | 6 | 6 |
| DCOB, Parts | 12 | 12 | 12 | 12 |
| Polyethylene, Parts | — | 2.1 | 4.2 | 8.7 |
| Burn Rating | SE-O | SE-O | SE-O | SE-O |

Table IV-continued

| Run No. | 15 | 16 | 17 | 18 |
|---|---|---|---|---|
| Dripping | NO | NO | NO | NO |
| Physical Properties - Unaged | | | | |
| Tensile Strength, psi | 3620 | 3910 | 3030 | 1770 |
| Elongation at break, % | 440 | 425 | 440 | 360 |
| Physical Properties - Aged 7 days at 97% Relative Humidity and at 97°C. | | | | |
| Tensile Strength, psi | 1770 | 2600 | 1940 | 1030 |
| Elongation at break, % | 400 | 480 | 460 | 300 |
| % Change of Tensile | −51 | −33 | −36 | −42 |
| % Change of elongation | −9 | +13 | +5 | −17 |

What is claimed is:

1. A flame resistant thermoplastic composition comprising a blend of
   a. a thermoplastic polyurethane elastomer essentially devoid of ethylene unsaturation and free —NCO groups,
   b. a chlorinated polyethylene having a chlorine content of 25 to 50 percent by weight,
   c. a flame retardant selected from the group consisting of 1,2,3,4,7,8,9,10,13,13,14,14-dodecaachloro-1,4,4a,6a,7,10,10a12a-octahydro-1,4:7,10-dimethano-dibenzocyclooctane, 1,2,3,4,5,6,7,8,10,10,11,11-dodecachloro-1,4,4a,4b,5,8,8a,9a-octahydro-1,4:5,8-dimethano-dibenzofuran, 6-(1',4',5',6',7',7'-hexachloronorborn-5'-en-2'-yl)-1,2,3,4,10,10-hexachloro-1,4,4a,5,6,7,8,8a-octahydro-1,4:5,8-dimethanonaphthalene, and 6-(1',4',5',6',7',7'-hexachloronorborn-5'-en-2'-yl)-1,2,3,4,10,10,-hexachloro-1,4,4a,5,6,7,8,8a-octahydro-1,4-methanonaphthalene, wherein
   the weight ratio of (a) to (b) in said blend is within the range from 90:10 to 60:40 and the mount of (c) is from 15 to 25 parts per 100 parts by weight of (a) plus (b).

2. The composition of claim 1 wherein (d) polyethylene resin is added in up to about 6 parts per 100 parts by weight of (a) plus (b).

3. The composition of claim 1 wherein (d) polyethylene resin is added in 2 to 4 parts per 100 parts by weight of (a) plus (b).

4. The composition of claim 1 wherein (e) antimony trioxide is added and the total amount of (c) plus (e) is from 13 to 25 parts and the amount of (c) is at least 5 parts, both per 100 parts by weight of (a) plus (b).

5. The composition of claim 5 wherein the total amount of (c) plus (e) is from 17 to 20 parts, per 100 parts by weight of (a) plus (b).

6. The composition of claim 1 wherein the flame retardant is 1,2,3,4,5,6,7,8,10,10,11,11-dodecachloro-1,4,4a,4b,5,8,8a,9a-octahydro-1,4:5,8-dimethano-dibenzofuran.

7. The composition of claim 1 wherein the flame retardant is 1,2,3,4,7,8,9,10,13,13,14,14-dodecachloro-1,4,4a,6a,7,10,10a,12a-octahydro-1,4:7,10-dimethanodibenzocyclooctane.

8. The composition of claim 1 wherein (a) is a reaction product of a polymeric polyol, an organic polyisocyanate and a low molecular weight bi-functional material having two reactive hydrogens.

9. The composition of claim 1 wherein the polyurethane polymer is an elastomer.

10. A method of making a flame resistant shaped article comprising preparing a flame resistant thermoplastic composition comprising a blend of
    a. a thermoplastic polyurethane elastomer essentially devoid of ethylenic unsaturation and free —NCO groups,
    b. a chlorinated polyethylene having a chlorine content of 25 to 50 percent by weight,
    c. a flame retardant selected from the group consisting of 1,2,3,4,7,8,9,10,13,13,14,14-dodecahchloro-1,4,4a,6a,7,10,10a,12a-octahydro-1,4:7,10-dimethano-dibenzocyclooctane, 1,2,3,4,5,6,7,8,10,10,11,11-dodecachloro-1,4,4a,4b,5,8,8a,9a-octahydro-1,4:5,8-dimethano-dibenzofuran,6-(1',4',5',6',7',7'hexachloronorborn-5'-en-2'-yl)-1,2,3,4,10,10-hexachloro-1,4,4a,5,6,7,8,8a-octahydro-1,4:5,8:dimethanonaphthalene, and 6-(1',4',5',6',7',7'-hexachloronorborn-5'-en-2'-yl)-1,2,3,4,10,10-hexachloro-1,4,4a,5,6,7,8,8a-octahydro-1,4-methanonaphthalene, wherein
    the weight ratio of (a) to (b) in said blend is within the range from 90:10 to 60:40 and the amount of (c) is from 15 to 25 parts per 100 parts by weight of (a) plus (b).

11. The method of claim 12 wherein (d) polyethylene resin is added in up to about 6 parts per 100 parts by weight of (a) plus (b).

12. The method of claim 13 wherein (e) antimony trioxide is added in such an amount that the total of (c) plus (e) is from 13 to 25 parts and the amount of (c) is at least 5 parts, both per 100 parts by weight of (a) plus (b).

13. The product obtained from the method according to claim 10.

14. The product obtained from the method according to claim 11.

15. The product obtained from the method according to claim 12.

* * * * *

UNITED STATES PATENT OFFICE
CERTIFICATE OF CORRECTION

Patent No. 3,970,716   Dated July 20, 1976

Inventor(s) Carl A. Evers et al.

It is certified that error appears in the above-identified patent and that said Letters Patent are hereby corrected as shown below:

Claim 11, line 1, delete "12" and insert --10--.

Claim 12, line 1, delete "13" and insert --11--.

Signed and Sealed this

Twenty-first Day of December 1976

[SEAL]

Attest:

RUTH C. MASON
Attesting Officer

C. MARSHALL DANN
Commissioner of Patents and Trademarks